J. KNAPPICH.
WELDING BURNER.
APPLICATION FILED FEB. 1, 1909.
943,882.
Patented Dec. 21, 1909.
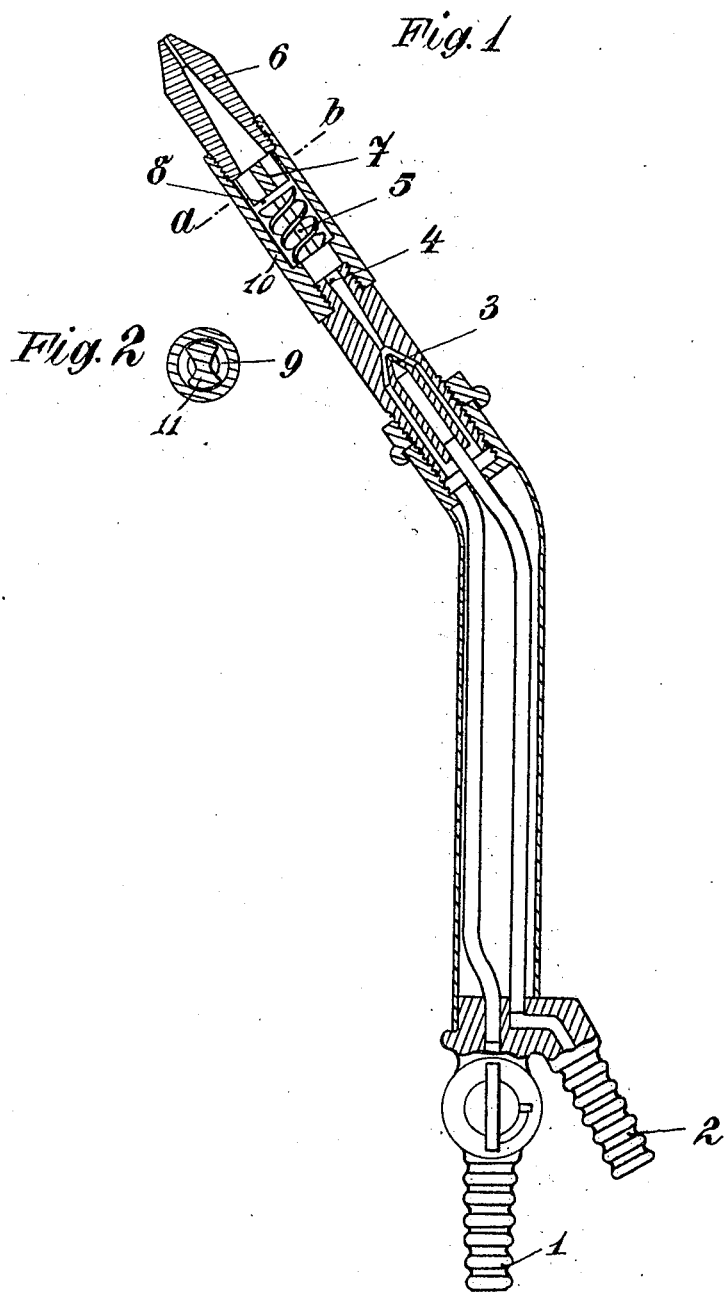
Witnesses
G. C. Crocker
G. H. Griesbauer
Inventor
Jacob Knappich
by H. B. Willson & Co.
ATTORNEYS.

UNITED STATES PATENT OFFICE.

JACOB KNAPPICH, OF AUGSBURG, GERMANY.

WELDING-BURNER.

943,882.  Specification of Letters Patent.  Patented Dec. 21, 1909.

Application filed February 1, 1909. Serial No. 475,473.

*To all whom it may concern:*

Be it known that I, JACOB KNAPPICH, managing director, citizen of Germany, residing at 11 Gesundbrunnenstrasse, Augsburg, in the Kingdom of Bavaria and Empire of Germany, have invented new and useful Improvements in Welding-Burners, of which the following is a specification.

The present invention relates to welding burners and a primary object is to provide a device for intimately mixing combustible gas with the gas supporting combustion in such burners.

In burners used for welding, so-called welding pistols, it is frequently necessary to make an intimate mixture of oxygen or air with combustible gases of different specific weight, in order to obtain a welding flame having a high temperature. It has been found however, particularly in those welding pistols in which the combustible gas at a low pressure is carried along as in an injector by oxygen flowing at a high pressure through a central nozzle, that these two gases are not sufficiently intimately mixed within the burner. As is known, such an intimate mixture can be brought about by the gas being compelled to repeatedly change its direction of flow while passing through the burner. But if this is effected by plates or the like being arranged projecting laterally at intervals in the interior of the welding pistol, at those places where the plates are situated the passage for the gas is considerably narrowed; the gas is therefore repeatedly throttled and expanded again, and there are considerable losses of pressure which prejudice the efficiency of such welding pistols. If, on the other hand, the repeated change of direction is brought about by arranging a spiral or worm, it is found that the mixture of gases continues circulating after leaving the spiral or worm. This formation of eddies in the gaseous mixture, however, prevents a good, well-defined welding cone in the flame being formed. In accordance with the present invention all these defects are avoided, but nevertheless in welding pistols having an injector-like action the combustible gas is intimately mixed with the gas which supports the combustion, whether oxygen or air. This is obtained by an eddying motion being first imparted to the gases after they meet in the burner, but in doing away with this motion before the gaseous mixture passes out of the burner. The gases are intimately mixed by the eddying motion, but owing to the eddies being subsequently stopped the formation of a sharp welding cone is possible. Within the turns of the spiral the velocities are different; on account of these different velocities of the mixture of gas and oxygen the layers of the mixture flowing through the spiral are displaced, an intimate mixture being, of course, obtained thereby. If the gaseous mixture is divided into several separate currents and if a spiral motion is imparted to the latter, for example by providing in the welding pistol a worm or spiral having more than one thread, when uniting again in the burner-tube the currents will whirl through one another; this causes the particles of gas to be intimately mixed, it is true, but it renders the formation of a sharp welding cone more difficult without the provision of special devices which do away with the eddies.

In order that the invention may be clearly understood reference will be made to the accompanying drawing in which one constructional form of a mixing device for welding burners is represented by way of example, and in which:

Figure 1 is a vertical section through a welding pistol, and Fig. 2 is a cross-section in the plane *a—b* in Fig. 1.

Referring to the drawing, the gas, preferably oxygen, used for supporting combustion and flowing under pressure through the pipe 2, when emitting from the nozzle 3 carries with it the combustible gas at a less pressure from the pipe 1. The mixture of gases then enters into the mixing chamber 4 in the burner-tube 10. In the mixing chamber there is provided a worm or spiral 5 having several threads, so that the gaseous mixture is compelled to divide into several currents and to flow through the spiral or worm with a spiral motion. When leaving the spiral the circulating currents of gas meet in the chamber-like space 8 and the eddying currents here cause the particles of gas to mix still more intimately. The eddying currents then hit against a metal member 7 which has two passages 9, through which the currents of gas pass. The eddying or whirling motion is stopped in this manner, so that the mixture of gas and oxygen flows on in a straight line and emits from the nozzle 6, in front of which a sharply defined welding cone forms.

The chamber-like space between the spiral and the device for stopping the eddying motion can be made larger or smaller than represented as desired in each instance. Also for this purpose the spiral 5 or the member 7 can be arranged movable and adjustable. The device 7 for doing away with the eddying motion may also be constructed otherwise than as represented in the drawing. For example it may be formed by plates or the like arranged transversely in the burner-tube. The mixing spiral may also be arranged in the pistol in such a manner that it is able to rotate around its own axis and thus be rotated at a high speed by the pressure of the gaseous mixture as in a turbine.

What I claim as my invention and desire to secure by Letters Patent is:

1. In a welding burner, the combination, with the burner-tube having a mixing chamber, of a worm or spiral having a plurality of threads in said chamber, and means in said burner-tube at an adjustable distance in front of said worm or spiral for stopping the eddying motion of gases passing through the latter.

2. In a welding burner, the combination, with the burner-tube having a mixing chamber, of a worm or spiral having a plurality of threads in said chamber, and walls arranged transversely in said burner-tube in front of said worm or spiral for stopping the eddying motion of gases passing through the latter.

3. In a welding burner, the combination with a burner tube having a mixing chamber, of a worm or spiral having a plurality of threads inserted in said chamber, and a wall arranged at the back of said worm or spiral, thereby providing straight passages for the gases.

In testimony whereof I have hereunto set my hand in presence of two subscribing witnesses.

JACOB KNAPPICH.

Witnesses:
LOUIS MUELLER,
ABRAHAM SCHLESINGER.